United States Patent
Moxon

(10) Patent No.: US 11,113,979 B2
(45) Date of Patent: Sep. 7, 2021

(54) AERODROME SYSTEM AND METHOD

(71) Applicant: ROLLS-ROYCE plc, London (GB)

(72) Inventor: Matthew Moxon, Derby (GB)

(73) Assignee: ROLLS-ROYCE plc, London (GB)

( * ) Notice: Subject to any disclaimer, the term of this patent is extended or adjusted under 35 U.S.C. 154(b) by 302 days.

(21) Appl. No.: 16/429,156

(22) Filed: Jun. 3, 2019

(65) Prior Publication Data
US 2020/0005657 A1 Jan. 2, 2020

(30) Foreign Application Priority Data

Jun. 28, 2018 (GB) .................................... 1810605

(51) Int. Cl.
| | |
|---|---|
| *G08G 5/00* | (2006.01) |
| *G08G 5/02* | (2006.01) |
| *B64F 1/20* | (2006.01) |
| *G08G 5/06* | (2006.01) |
| *B64D 47/00* | (2006.01) |
| *F21S 8/00* | (2006.01) |

(Continued)

(52) U.S. Cl.
CPC ............. *G08G 5/025* (2013.01); *B64D 47/00* (2013.01); *B64F 1/20* (2013.01); *B64F 1/205* (2013.01); *F21S 8/00* (2013.01); *F21S 8/032* (2013.01); *G08G 5/0026* (2013.01); *G08G 5/065* (2013.01); *B64D 2203/00* (2013.01); *F21W 2111/06* (2013.01); *G08G 5/0013* (2013.01); *G09F 9/302* (2013.01)

(58) Field of Classification Search
None
See application file for complete search history.

(56) References Cited

U.S. PATENT DOCUMENTS

| | | | |
|---|---|---|---|
| 2,370,424 A | 2/1945 | Samuel | |
| 2,486,198 A | 10/1949 | Newstedt | |

(Continued)

FOREIGN PATENT DOCUMENTS

| | | |
|---|---|---|
| EP | 0613110 A1 | 8/1994 |
| EP | 2962941 A1 | 1/2016 |
| WO | 2008/073322 A1 | 6/2008 |

OTHER PUBLICATIONS

Nov. 25, 2019 Search Report issued in European Patent Application No. 19177635.

(Continued)

*Primary Examiner* — Brent Swarthout
(74) *Attorney, Agent, or Firm* — Oliff PLC

(57) ABSTRACT

An aerodrome system for an aerodrome is provided. The aerodrome system comprises a plurality of light emitting elements configured to emit light from a surface of the aerodrome upon which aircraft may take-off, land and manoeuvre; and a controller operatively coupled to each of the light emitting elements so as to selectively control the light emitting elements, wherein the light emitting elements form pixels of a display and the controller is configured to control an image displayed by the display so as to display and demarcate at least one runway for aircraft to take-off or land, wherein the light emitting elements are spaced such that the controller may display the runway with a variable orientation and the controller is further configured to change the image displayed by the display so as to change the orientation of the runway.

19 Claims, 6 Drawing Sheets

(51) Int. Cl.
*G09F 9/302* (2006.01)
*F21W 111/06* (2006.01)

(56) References Cited

U.S. PATENT DOCUMENTS

| | | | | |
|---|---|---|---|---|
| 2,572,451 | A | 10/1951 | Custer | |
| 4,093,937 | A * | 6/1978 | Habinger | B64F 1/20 |
| | | | | 250/215 |
| 4,201,973 | A * | 5/1980 | Jackson | G01P 13/045 |
| | | | | 340/949 |
| 4,951,046 | A * | 8/1990 | Lambert | H05B 47/185 |
| | | | | 340/953 |
| 5,243,340 | A * | 9/1993 | Norman | G08G 5/065 |
| | | | | 340/953 |
| 5,368,257 | A | 11/1994 | Novinger | |
| 6,354,714 | B1 | 3/2002 | Rhodes | |
| 7,023,361 | B1 * | 4/2006 | Wallace | B64F 1/20 |
| | | | | 244/114 R |
| 7,898,463 | B1 | 3/2011 | Mueller et al. | |
| 9,572,223 | B1 * | 2/2017 | Mula | H05B 45/22 |
| 2006/0092491 | A1 | 5/2006 | Wang | |
| 2012/0075121 | A1 * | 3/2012 | O'Hara | G08G 5/045 |
| | | | | 340/961 |
| 2013/0147389 | A1 | 6/2013 | Hoffer, Jr. et al. | |
| 2017/0036778 | A1 * | 2/2017 | Lowe | G08G 5/025 |

OTHER PUBLICATIONS

Dec. 10, 2018 Search Report issued in British Patent Application No. 1810605.4.

* cited by examiner

AERODROME SYSTEM AND METHOD

CROSS-REFERENCE TO RELATED APPLICATIONS

This specification is based upon and claims the benefit of priority from UK Patent Application Number 1810605.4 filed on 28 Jun. 2018, the entire contents of which are incorporated herein by reference.

TECHNICAL FIELD

This disclosure relates to the field of flight operations, and particularly although not exclusively, relates to an aerodrome system and method which changes the orientation of a runway according to wind direction.

BACKGROUND

Historically, slow aircraft were operated from open fields. Hardened runways emerged as a response to increasing aircraft flight speeds—which reduces sensitivity to cross-winds—and the accompanying increasing tyre pressures, which exceeded the load bearing capacity of turf. Consequently, aerodromes usually provide hardened runways in a single or very limited number of orientations that enable the commercial, high frequency operation of faster aircraft.

The slower an aircraft flies, the more susceptible it becomes to cross-winds. Propelling an aircraft in a direction unaligned with the wind requires steering of the aircraft at a slip angle away from the intended direction of travel. In identical wind conditions, an aircraft traveling at slow speeds will need to be steered at a greater slip angle than an aircraft travelling at greater speeds. Correctly aligning the direction of travel with the runway prior to landing helps to avoid tyre skidding and increased wear. It also minimises disturbance to passengers. Furthermore, it is desirable for aircraft to take-off into a headwind since this helps generate the required lift for take-off.

Some aerodromes have a single runway which is aligned with the average annual prevailing wind. Others comprise multiple, differently aligned runways so that a pilot or air traffic controller can choose a runway with the greatest headwind component. Such systems present numerous challenges for slower aircraft, such as short take-off and landing (STOL) which provide an alternative to road and rail transport for inter-city commuting.

SUMMARY

According to the present disclosure there is provided an aerodrome system for an aerodrome, the aerodrome system comprising: a plurality of light emitting elements configured to emit light from a surface of the aerodrome upon which aircraft may take-off, land and manoeuvre; and a controller operatively coupled to each of the light emitting elements so as to selectively control the light emitting elements, wherein the light emitting elements form pixels of a display (e.g. spread over the surface) and the controller is configured to control an image displayed by the display so as to display and demarcate at least one runway for aircraft to take-off or land, wherein the light emitting elements are spaced (e.g. distributed over the surface) such that the controller may display the runway with a variable orientation and the controller is further configured to change the image displayed by the display so as to change the orientation of the runway.

The light emitting elements may be spaced (e.g. distributed over the surface) such that the controller may display the runway with a continuously variable orientation.

Each of the light emitting elements may be configured to display one or more colours.

Each of the light emitting elements may comprise at least one light emitting diode.

The aerodrome system may further comprise a plurality of tiles, wherein each of the tiles is configured to form the surface of the aerodrome upon which aircraft may take-off, land and manoeuvre, and wherein each of the tiles comprises at least one of the light emitting elements.

The tiles may comprise a plurality of light emitting elements and the light emitting elements of a particular tile may be configured to display multiple colours or a single colour.

Each of the tiles may be configured to simultaneously display multiple colours.

Neighbouring tiles may display different colours.

Each tile may be operatively coupled to a plurality of neighbouring tiles so as to form a mesh network of tiles.

A top surface of each of the tiles may be substantially flat. The top surface of each tile may be configured to support the weight of the aircraft e.g. transmitted through a wheel of the aircraft. Each tile may be porous to prevent the accumulation of standing water and/or the formation of an adverse ground effect for the operation of aircraft. The porosity of the tiles may vary as a function of radial distance from the centre of the aerodrome.

The tiles may tessellate. The tiles may be triangular, rectangular, square, hexagonal or any other construction of shapes that tessellate.

The controller may be configured to display a pair of runways.

One runway may be used exclusively or predominantly for departure operations and the other runway to be used exclusively or predominantly for arrival operations.

Other features typically provided to aerodromes (such as taxiways, parking areas, gates etc.) may be provided and may be asymmetrical about the centre of the aerodrome surface. The asymmetrical taxiway may be particularly advantageous because it allows ground operations to be insensitive to changes in runway directions, even if such changes occur whilst an aircraft is taxiing between the gate and the runway. There may be defined rights of way during ground operations which may permit the efficient operation of the aerodrome (such rights of way may be similar to those provided for roundabouts or 'traffic circles').

A control tower or a camera system (the camera system may be a substitute for the windows which are traditionally provided in a control tower) may be provided at the centre of the aerodrome. The tower may be the highest structure in the immediate vicinity of aircraft operations. This may be advantageous, since if the location of the tower is always fixed with respect to landing and departing aircraft, pilots may be trained to turn away from the centre of the aerodrome to reduce the risk of collision with the tower.

The runways may be provided either side of a terminal for receiving aircraft.

The runways may be provided adjacent to a terminal for receiving aircraft.

The runways may be substantially parallel with respect to each other, e.g. at any given moment.

Since a purpose of the system is to move the runways in order to limit the cross-wind requirements imposed upon departing and arriving aircraft, the runways may be substantially parallel at a moment in time.

The runway directions may or may not be changed simultaneously. In the latter case, this may promote safe and efficient operation of the aerodrome. For example, once an aircraft has committed to take-off, the departure runway may remain fixed until that aircraft has reached a pre-determined distance from the aerodrome. This may enable a pilot to look in a rear-view mirror and use the lights to track an extended centreline of the runway during the initial stages of the departure. The arrival runway might be permitted to move during this time. Departure and arrival operations may be staggered to provide clear airspace for a missed approach procedure, if required.

Movement of a runway may involve a sequence of events such as first re-colouring the runway to indicate that it is not in use, then fading it out, and then illuminating a new runway.

The aerodrome may be an aerodrome for short take-off and landing aircraft, short take-off and vertical landing aircraft (STOVL) and/or vertical take-off and landing aircraft (VTOL). Such aircraft may benefit from short runways to enhance their payload to range performance.

The controller may be configured to dynamically change the orientation of the runway in response to the wind direction.

The controller may be operatively coupled to an air traffic control system and the controller may be configured to change the orientation of the runway at an appropriate time determined from flight data from the air traffic control system.

The aerodrome system may further comprise a plurality of sensors distributable over the surface of the aerodrome so as to determine the location of aircraft on the aerodrome surface.

The sensors may be operatively coupled to the controller and the controller may be configured to provide feedback to an aircraft providing positional data of the aircraft from the sensors during a landing event. The provision of positional data may reduce or eliminate the need for ground radar systems to aid ground controllers.

Regions around aircraft, such as regions in the propulsion system slipstream, may be displayed on the surface of the aerodrome. This may facilitate other aircraft, vehicles and/or ground staff in avoiding regions which may cause difficulty, thereby reducing the risk of accidents.

The sensors may comprise pressure sensors and/or strain gauges e.g. in or between the tiles.

The sensors may be configured to collect data such as the sink rate at landing. The controller may be configured to use the data collected by the sensors to analyse the condition of the aerodrome system. For example, the analysis may enable the controller to determine if design loads (such as loads associated with the aircraft, individual tile, and/or aerodrome structure) have been exceeded. The sensors may be configured to collect data such as the landing impact force. This may enable the system to monitor the health of the aerodrome, the aircraft and/or passenger comfort. The system may be configured to determine tyre side forces by analysing the symmetry of landing, for example.

According to another aspect of the present disclosure there is provided an aerodrome comprising the aerodrome system as described above.

The aerodrome may be elevated above ground level, e.g. by virtue of one or more supports and/or a substructure.

The light emitting elements may be arranged so as to form a substantially circular perimeter of the surface.

A diameter of the perimeter may be approximately a factor of $\sqrt{2}$ times a length of the runway.

The light emitting elements may be arranged so as to surround a terminal for receiving aircraft.

The aerodrome may be or form at least part of an airport.

According to another aspect of the present disclosure there is provided a tile for an aerodrome, wherein the tile comprises at least one light emitting element and the tile is configured to form part of an aerodrome surface upon which aircraft may take-off, land and manoeuvre. The light emitting element(s) may form pixel(s) of a display. The display may display and demarcate at least one runway for aircraft to take-off or land. The tile may comprise any of the features otherwise mentioned above in respect of other aspects of the disclosure.

According to another aspect of the present disclosure there may be provided a method of displaying an aerodrome, the method comprising: displaying and demarcating at least one runway for aircraft to take-off or land using a plurality of light emitting elements configured to emit light from a surface of the aerodrome upon which aircraft may take-off, land and manoeuvre, and wherein the light emitting elements form pixels of a display, the light emitting elements being spaced such that the runway has a variable orientation; and controlling the light emitting elements so as to change the image displayed by the display and move the orientation of the runway.

The light emitting elements may be spaced such that the runway has a continuously variable orientation.

According to another aspect of the present disclosure there is provided a controller for controlling display of an aerodrome, the controller being configured to: display and demarcate at least one runway for aircraft to take-off or land using a plurality of light emitting elements configured to emit light from a surface of the aerodrome upon which aircraft may take-off, land and manoeuvre, and wherein the light emitting elements form pixels of a display, the light emitting elements being spaced such that the runway has a variable orientation; and control the light emitting elements so as to change the image displayed by the display and move the orientation of the runway.

The light emitting elements may be spaced such that the runway has a continuously variable orientation.

According to another aspect of the present disclosure there is provided a computer program that, when executed by a computer, causes performance of: displaying and demarcating at least one runway for aircraft to take-off or land using a plurality of light emitting elements configured to emit light from a surface of the aerodrome upon which aircraft may take-off, land and manoeuvre, and wherein the light emitting elements form pixels of a display, the light emitting elements being spaced such that the runway has a variable orientation; and controlling the light emitting elements so as to change the image displayed by the display and move the orientation of the runway.

The light emitting elements may be spaced such that the runway has a continuously variable orientation.

According to another aspect of the present disclosure there is provided a non-transitory computer readable storage medium comprising computer readable instructions that, when read by a computer, cause performance of: displaying and demarcating at least one runway for aircraft to take-off or land using a plurality of light emitting elements configured to emit light from a surface of the aerodrome upon which aircraft may take-off, land and manoeuvre, and wherein the light emitting elements form pixels of a display, the light emitting elements being spaced such that the runway has a variable orientation; and controlling the light emitting elements so as to change the image displayed by the display and move the orientation of the runway.

The light emitting elements may be spaced such that the runway has a continuously variable orientation.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION

For a better understanding of the present disclosure, and to show more clearly how it may be carried into effect, reference will now be made, by way of example, to the accompanying drawings, in which.

DETAILED DESCRIPTION

Figure 1:
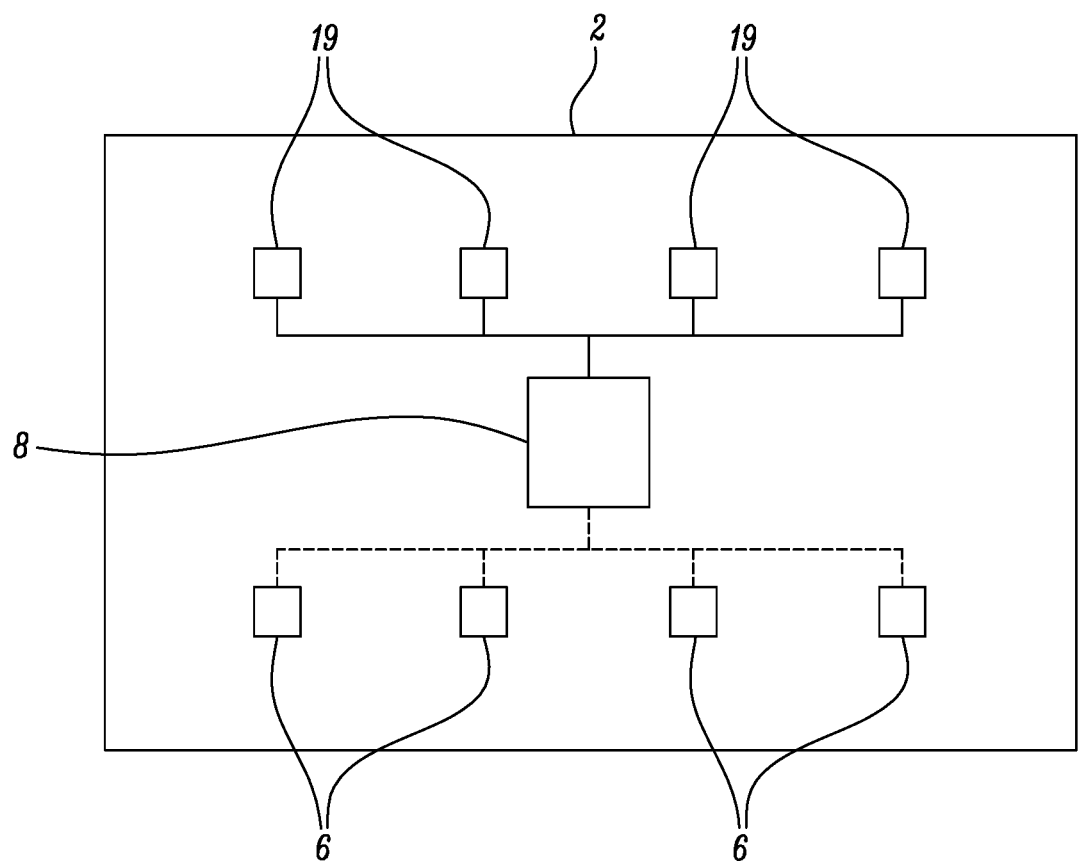
FIG. 1 is a schematic diagram of an aerodrome system.
Figure 2:
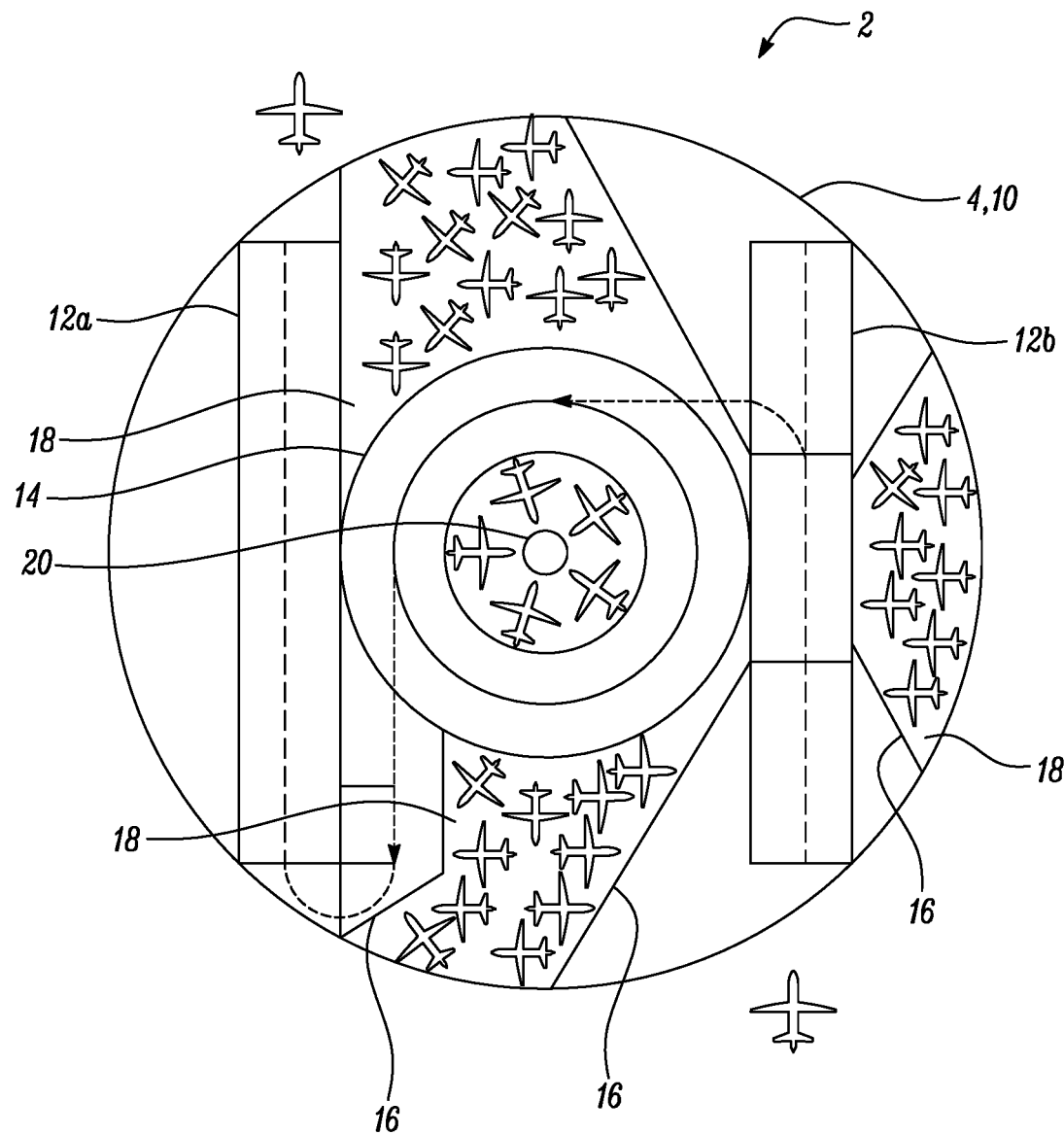
FIG. 2 is a schematic plan view of an aerodrome provided with the aerodrome system.

With reference to FIGS. 1 and 2, the present disclosure relates to an aerodrome system 2 that enables the take-off, landing and manoeuvring of aircraft on an aerodrome 4. As shown in FIG. 1, the aerodrome system 2 comprises a plurality of light emitting elements 6, such as light emitting diodes (LEDs), and a controller 8.

Figure 6:
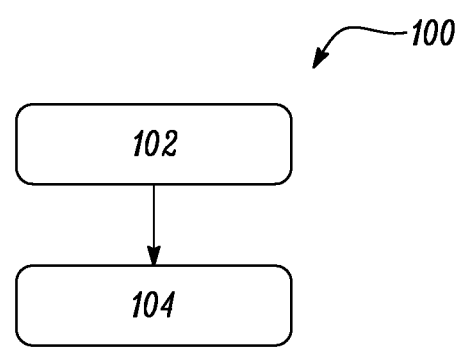
FIG. 6 is a flow diagram of a method of displaying an aerodrome.

The controller 8 may comprise any suitable circuitry to cause performance of the methods described herein and as illustrated in FIG. 6. The controller 8 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 8 may comprise at least one processor and at least one memory. The memory stores a computer program comprising computer readable instructions that, when read by the processor, causes performance of the methods described herein, and as illustrated in FIG. 6. The computer program may be software or firmware, or may be a combination of software and firmware.

The processor may include at least one microprocessor and may comprise a single core processor, may comprise multiple processor cores (such as a dual core processor or a quad core processor), or may comprise a plurality of processors (at least one of which may comprise multiple processor cores).

The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive or a secure digital card). The memory may include: local memory employed during actual execution of the computer program; bulk storage; and cache memories which provide temporary storage of at least some computer readable or computer usable program code to reduce the number of times code may be retrieved from bulk storage during execution of the code.

The computer program may be stored on a non-transitory computer readable storage medium. The computer program may be transferred from the non-transitory computer readable storage medium to the memory. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program may be transferred to the memory via a signal (such as a wireless signal or a wired signal).

Input/output devices may be coupled to the controller 8 either directly or through intervening input/output controllers. Various communication adaptors may also be coupled to the controller 8 to enable the system 2 to become coupled to other apparatus or remote printers or storage devices through intervening private or public networks. Non-limiting examples include modems and network adaptors of such communication adaptors.

As shown in FIG. 2, the aerodrome 4 is provided with a surface on which a display 10 is presented. The light emitting elements 6 form pixels of the display 10. The display 10 presents an image which comprises features of an aerodrome including a departure runway 12a, an arrival runway 12b, a taxiway 14, foul lines 16, parking regions 18 and/or any other aerodrome feature.

The taxiway 14 connects a terminal 20 (or hangar) to the runways 12a,b. The taxiway 14 surrounds the terminal 20. The plurality of light emitting elements 6 are substantially uniformly distributed around the aerodrome 4. In the depicted example, the aerodrome 4 is circular, although other shapes are also envisaged. The runways 12a and 12b are disposed along two parallel sides of a square whose vertices lie on the circumference of a circle. Accordingly, the diameter of the aerodrome 4 perimeter is approximately √2 (e.g. 1.414) times greater than a length of the runways 12a and 12b. The perimeter of the circle marks out the edge of the aerodrome 4.

The light emitting elements 6 may be arranged about the aerodrome 4 such that markings for take-off, landing and/or manoeuvring of aircraft can be sufficiently recognised by observation of the display 10 during operation.

The features of the aerodrome 4 may be displayed in any colour by the illumination of the light emitting elements 6. For example, the departure runway 12a may be displayed by red light emitting elements 6 and the arrival runway 12b may be displayed by green light emitting elements 6. The taxiway 14 may be displayed by orange light emitting elements 6. Foul lines 16 may be demarcated by red or white light emitting elements 6. Feature boundaries, direction indicators such as arrows and parking regions 18, for example, may be displayed using light emitting elements 6. In some arrangements, each light emitting element 6 may be configured to display a range of colours, for example a particular LED or cluster of LEDs may emit any of the colours mentioned above.

In some arrangements, the light emitting elements 6 may be directional such that the colour displayed may be a function of the view angle. For example, an aircraft attempting to land in the wrong direction could be presented with a red runway, whilst an aircraft approaching the same runway from the correct direction could be presented with a green runway. This differentiation may apply in both azimuth and elevation. For example, since the viewing angle for an aircraft in the runway is substantially shallower than the viewing angle for an aircraft approaching the same runway with the intent to land, the departure runway may be green for an aircraft correctly using it for take-off, but red for an aircraft incorrectly using it for an approach.

In some arrangements, the light emitting elements 6 may be configured to emit electromagnetic radiation of wavelengths outside the range of visible light. Aircraft which are fitted with instruments, such as synthetic vision systems, may be configured to convert the electromagnetic radiation emitted from the light emitting elements 6 into a display visible to a user. Using wavelengths outside of the visible range may enable the aerodrome system to be insensitive to weather conditions such as fog.

The plurality of light emitting elements 6 may be distributed (e.g. uniformly distributed) across the aerodrome surface to enable the runways 12a and 12b to be displayed in alignment with any direction. The density of light emitting elements 6 may be sufficient to display the runways 12a and 12b with a substantially continuously variable orientation.

The light emitting elements 6 of the aerodrome system 2 may form pixels of display 10. The controller 8 is configured to control an image displayed by the display 10. The display 10 demarcates the runways 12a and 12b for an aircraft to take-off or land. The controller 8 is configured to move the orientation of the runways 12a and 12b by changing the image displayed.

The controller 8 may be configured to monitor the climatic parameters, such as the direction of the prevailing wind, and determine the optimal orientation for the runways 12a and 12b. The controller 8 may be configured to receive information from a plurality of optional sensors 19, arranged on the aerodrome 4 and/or external systems. External systems may include a weather vane, anemometer, weather station and/or database. The controller 8 may be configured to determine the average wind direction measured within a predefined time period and realign the runways 12a and 12b to align with the wind direction. The wind direction determination and realignment of runways may be performed at predetermined time intervals during which no aircraft are arriving or departing. During these intervals, the controller 8 may modify the image displayed by the light emitting elements 6. The controller 8 may alternatively be configured to modify at least a portion of the display 10 at any point in time.

The controller 8 may be configured to automatically modify the display 10 according to the climatic information received and/or flight data.

Modulation of directional lighting may be used to transmit data to an individual aircraft. Providing a large number of light emitting elements 6 enables the potential bandwidth of the directional lighting to be large. The data may facilitate closed-loop control of the aircraft's approach path. An important advantage of such a system is that it may be configured to be independent of satellite navigation systems. This could provide safety advantages by, for example, displaying failure states on the surface of the aerodrome in a non-visible wavelength to alert pilots and ground controllers.

A user, such as an operator in air traffic control, may be enabled to override any command or automated process determined or issued by the controller 8 or any external system. In alternative arrangements, the controller 8 may be partially or entirely directed by an operator. For example, the aerodrome system 2 may comprise a user input device (such as a touchscreen display, a keyboard, a computer mouse, or a keypad, for example) and the user may operate the user input device to control the operations controlled by the controller 8.

The plurality of optional sensors 19 may be distributable over the surface of the aerodrome. The sensors 19 may be operatively coupled to the controller 8. The controller 8 may be configured to collect data from the plurality of sensors 19 and/or aircraft so as to determine the location of aircraft on the aerodrome surface. The controller 8 may be configured to provide feedback to an aircraft using the positional data collected from the sensors 19 during a landing event.

The provision of positional data may reduce or eliminate the need for ground radar systems to aid ground controllers. Regions around aircraft, such as regions in the propeller slipstream, may be displayed on the surface of the aerodrome 4. This may facilitate other aircraft in avoiding regions which may cause difficulty, thereby reducing the risk of accidents. The sensors 19 may be configured to collect data such as the sink rate at landing. The controller 8 may be configured to use the data collected by the sensors 19 to analyse the condition of the aerodrome system 2. For example, the analysis may enable the controller 8 to determine if design loads have been exceeded.

The controller 8 may be configured to operate the aircraft, for example, to move the aircraft from one parking region 18 to another.

The light emitting elements 6 may be arranged in a mesh network. Each light emitting element 6 may form a node of a mesh network. For example, with each light emitting element 6 being operatively coupled to a plurality of neighbouring light emitting elements 6. Power and/or data may be sent via the mesh network. This configuration enables the repair of individual light emitting elements 6 with no or minor disruption to the aerodrome 4. The light emitting elements 6 may be communicatively connected to the controller 8 and/or one another by cables and/or wirelessly. The light emitting elements 6 may be powered through electrical connections routed below the surface of the aerodrome 4. In alternative arrangements, the light emitting elements 6 may be individually powered and/or supported by batteries which may provide a reserve power supply.

Data relating to the functioning of the system, such as a fault, may be transmitted through the mesh network, thereby facilitating the planning of maintenance and minimising disruption to the aerodrome system 2. The aerodrome system 2 may comprise multiple redundancies, for example, the number of light emitting elements 6 may be sufficiently large such that a fault(s) in a light emitting element(s) may negligibly affect the performance of the aerodrome system 2.

In some arrangements, the surface of the aerodrome 4 may be elevated. Structural elements may be provided below the surface to support the elevation. The aerodrome 4 may be provided above or adjacent to an existing structure or structures, such as a train station. This facilitates the integration of the aerodrome 4 with existing transport and electrical infrastructure. The elevation of the aerodrome 4 may permit structures below to be preserved, enabling the aerodrome 4 to be provided without the removal of green space or existing buildings for example. The aerodrome may be supported by a space frame, e.g. to enable the structure beneath the aerodrome 4 to be visible. As such, the aerodrome 4 can be provided in urban areas. In cities, for example, where tall structures restrict the available airspace, elevating the aerodrome 4 reduces or eliminates the obstructive effect of neighbouring buildings on airspace. Another advantage of the elevation is the avoidance of turbulence downwind of buildings. Another advantage of the elevation is that the aerodrome surface and therefore aircraft movements may be distanced from the public, thereby reducing the noise nuisance to the public.

The runways 12a and 12b may be of any length. In some arrangements, the runways 12a and 12b may be approximately the length of an aircraft supercarrier such as a Forrestal-class aircraft carrier. The runways 12a and 12b may be optimally sized for operation with a specific type of aircraft. For example, if STOL aircraft of International Civil Aviation Organisation (ICAO) Annex 14 Code C are to be operated on the aerodrome 4, the runways 12a and 12b may be 300 m long and 50 m wide. Therefore, in this example, the aerodrome 4 may have a diameter of approximately 425 m.

The aerodrome 4 may be configured to change the size of the runway 12. For example, the width and/or length of the runway 12 may be modifiable according to the requirements of the aircraft due to land/take off from it. The aerodrome 4 may be configured to display a plurality of runways 12.

In the depicted arrangement, the aerodrome 4 is circular, thereby minimising the area required to display a pair of runways 12a and 12b either side of a terminal 20. In one arrangement, the aerodrome system 2 may be configured to provide a single runway 12 that passes through the centre of a circular aerodrome 4. The runway 12 may be substantially equal in length to the diameter of the aerodrome 4. The runway 12 may be rotatable about an axis that runs through the centre of the aerodrome 4 and is perpendicular to the surface of the aerodrome 4. The single runway 12 may be provided for arrival and departure of aircraft in locations in which the size of the aerodrome 4 must be minimal.

The controller 8 may communicate with an air traffic control system for coordinating air traffic. Alternatively, the controllers 8 of more than one aerodrome 4 may operate in communication with one another and the controllers 8 may be configured to coordinate the distribution of air traffic between them. In either case, the controller 8 may change the orientation of the runway 20 at an appropriate time, e.g. when an aircraft is not about to land.

The aerodrome system 2 may further comprise any provision desirable for aviation such as fueling or charging stations.

The parking regions 18 may be designated for parking and/or standing of aircraft at particular times of operation of the aerodrome 4, such as during a period of inactivity during the night. The controller 8 may be configured to display parking regions 18 during other periods of time. This feature is useful for electric aircraft which have a particularly limited flight duration compared to conventional jet engine aircraft.

Unexpected weather conditions and disruption may prevent aircraft from arriving at their intended destination and force the aircraft to divert and stand or park at another aerodrome 4.

Figure 3:
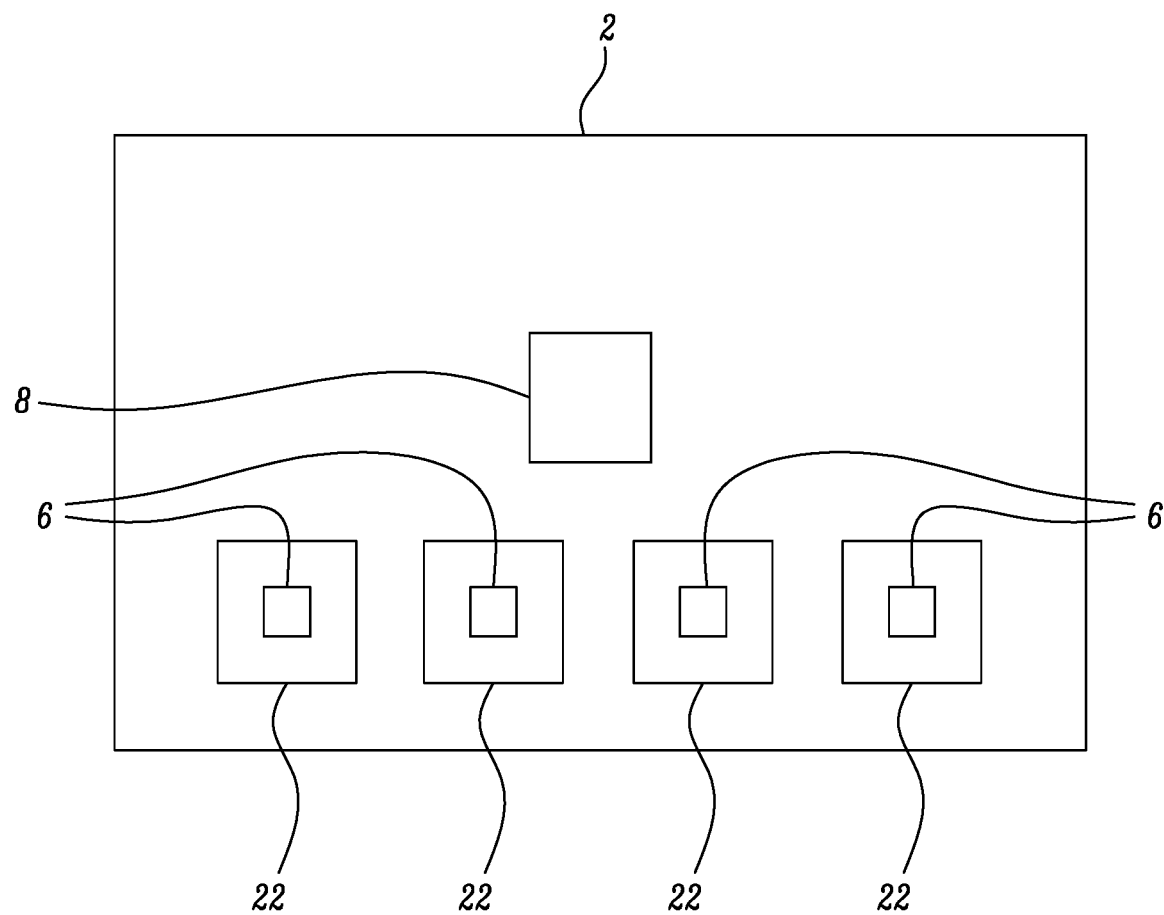
FIG. 3 is a schematic diagram of an aerodrome system comprising a plurality of tiles.
Figure 4:
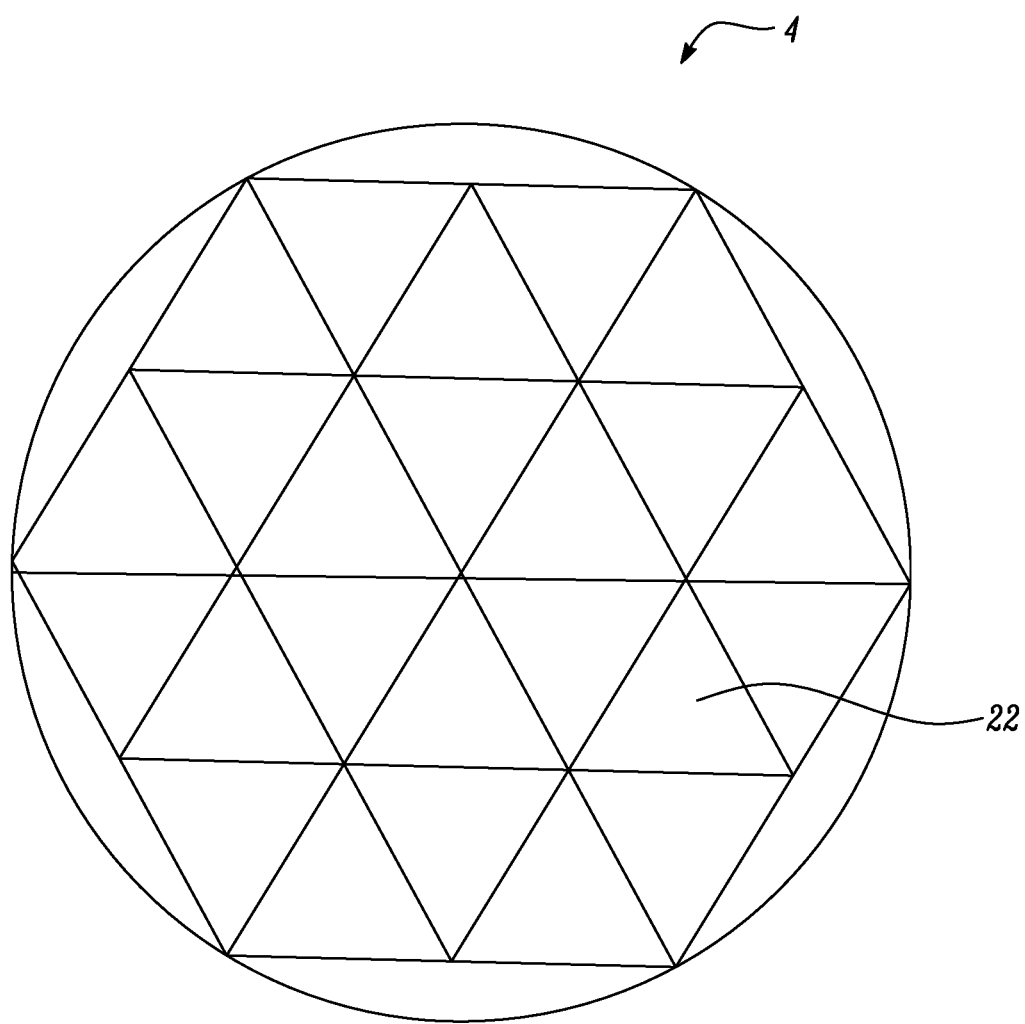
FIG. 4 is a schematic plan view of an aerodrome comprising a plurality of tiles.

In one arrangement, the light emitting elements 6 may be provided in or beneath the surface of the aerodrome 4, e.g. with the surface being formed from cement. However, with reference to FIG. 3, the aerodrome system 2 of FIG. 1, may in other arrangements further comprise a plurality of tiles 22. Each of the plurality of tiles 22 comprises at least one light emitting element 6. Each tile 22 is arranged to form the surface of the aerodrome 4 upon which an aircraft may take-off, land and manoeuvre. As shown in FIG. 4, tiles 22 may be triangular and may be arranged in a repeating pattern to cover a large portion of the aerodrome 4.

Each of the tiles 22 may form a node of a mesh network. For example, each tile 22 may be operatively coupled to a plurality of neighbouring tiles 22. Power and/or data may be sent via the mesh network. This configuration facilitates assembly and repair of individual tiles 22 with no or minor disruption to the operation of the aerodrome system 2. Tiles 22 may be communicatively connected to the controller 8 and/or one another by cables and/or wirelessly.

Figure 5:
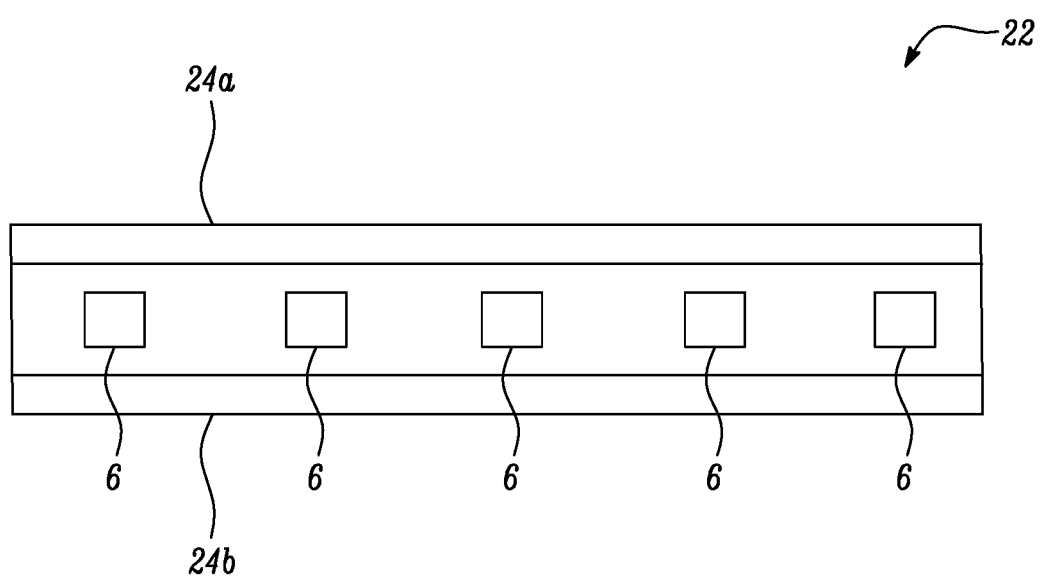
FIG. 5 is a schematic cross-sectional view of a tile.

With reference to FIG. 5, each tile 22 comprises an upper layer 24a and a lower layer 24b. The light emitting elements 6 are arranged in an array enclosed within the tile 22, between the upper and lower layers 24a and 24b. The LEDs 6 may be equally spaced from one another. In some arrangements, the LEDs 6 may be disposed at, above or below the surface of the aerodrome 4.

Each of the tiles 22 may comprise a plurality of regions, wherein each region comprises a plurality of light emitting elements configured to display a single colour. The regions may be arranged in rows or clusters of colours in a repeating series. By turning on only rows or clusters of the same colour, the tile 22 may appear to be uniformly covered in a single colour.

Alternatively, neighbouring tiles 22 may be configured to display different colours such that in order to display a desired colour, the appropriate tile 22 may be illuminated whilst the neighbouring tiles 22 are turned off.

The tiles 22 may be of any shape and size. The tiles 22 may be identically shaped to enable ease of replacement, however, in alternative arrangements, the tiles 22 may be provided in different shapes and sizes appropriate to different locations on the aerodrome 4. The tiles 22 may be triangular, hexagonal, rectangular, or square for example, to provide edges which can be aligned and/or fitted to one another. The tiles 22 can be fitted adjacent to one another to form a continuous surface of the aerodrome 4. The tiles 22 may be provided as standard units to facilitate assembly, repair and replacement of the tiles 22. The aerodrome system 2 may comprise any number of tiles 22. The tiles 22 may be optimally sized for ease of transport, fitting and/or maintenance. For example, the size of the tiles may be approximately of the order of 1-2 m.

The resolution of the display 10 produced by the plurality of tiles 22 may vary according to the location on the aerodrome 4. The pixels of the display 10 may be provided by the light emitting elements 6, arrays of light emitting elements 6, tiles 22 and/or groups of tiles 22. The resolution may be determined by the controller 8, or the spacing of the tiles 22, or the spacing of the LEDs 6 in the arrays within the tiles 22.

In some arrangements, the tiles 22 may be configured to be installed, mounted or placed onto an existing aerodrome surface.

The sensors 19 e.g. in the form of strain gauges, may be provided on and/or between the tiles 22. The strain gauges may be configured to locate aircraft on the aerodrome 4. The strain gauges may be configured to measure relative displacement between tiles 22.

The surface of the aerodrome 4 may consist entirely of the plurality of tiles 22. However, in alternative arrangements, the surface may be formed by a matrix comprising a plurality of tiles 22 and alternative surfaces. The alternative surfaces may include other tiles, concrete, asphalt, gravel, ice, salt, grass, heavy duty matting, dirt or a mixture of these materials. The surface may be formed by alternating between the plurality of tiles 22 and at least one other material.

The aerodrome 4 may be configured to comply with any rules and regulations provided by an Authority.

With reference to FIG. 6, the aerodrome system 2 may be used to perform a method 100 of displaying an aerodrome. In step 102, the aerodrome system 2 provides at least one runway 12 for aircraft to take-off or land on. The runway 12 is displayed and demarcated using the plurality of light emitting elements 6. The light emitting elements 6 are configured to emit light from the surface of the aerodrome 4, upon which aircraft may take-off, land and manoeuvre. The light emitting elements 6 form pixels of the display 10 and are spaced such that the runway 12 has substantially continuously variable orientation.

In step 104, the light emitting elements 6 are configured to change the image displayed by the display 10 and move the orientation of the runway 12. This change of orientation may be triggered by a change in wind direction. For example, the controller 8 may measure and average the direction of the wind over a predefined period of time and align the runway 12 with the averaged wind direction. The controller 8 may receive the wind direction from an external system. Alternatively, the controller 8 may be directed by an operator, such as a person in air traffic control, to align the runway 12 with a particular direction.

Upon receiving a signal that the direction must be changed, the controller 8 sends signals to the light emitting elements 6 to illuminate, turn-off, or change colour in order to display a runway 12 in a different orientation. The communication between the controller 8 and the light emitting elements 6 may be carried out through a mesh network. The controller 8 may determine the wind direction at given time intervals, or continuously.

Aircraft may be directed to travel around the aerodrome 4 in a circular arrangement when preparing to land. This may enable the flow of approaching aircraft and facilitate the organisation of landing sequence. The aircraft may be directed to follow a circular path and deviate from it in order to land when instructed to do so.

It will be appreciated by those skilled in the art that although the disclosure has been described by way of example, with reference to one or more exemplary examples, it is not limited to the disclosed examples and that alternative examples could be constructed without departing from the scope of the disclosure as defined by the appended claims.

I claim:

1. An aerodrome system for an aerodrome, the aerodrome system comprising:
   a plurality of light emitting elements configured to emit light from a surface of the aerodrome upon which aircraft may take-off, land and maneuver; and
   a controller operatively coupled to each of the light emitting elements so as to selectively control the light emitting elements to emit light of a first color in a first direction along a runway and light of a different color in an opposite direction,
   wherein the light emitting elements form pixels of a display,
   wherein the controller is configured to control an image displayed by the display so as to display and demarcate a pair of runways for aircraft to take-off or land,
   wherein the light emitting elements are spaced and have a density such that the controller may display the runways with a continuously variable orientation,
   wherein the controller is further configured to change the image displayed by the display so as to dynamically change the orientation of the runways and to realign the runways in response to a wind direction.

2. The aerodrome system of claim 1, wherein the aerodrome system further comprises a plurality of tiles, wherein each of the tiles is configured to form the surface of the aerodrome upon which aircraft may take-off, land and maneuver, and wherein each of the tiles comprises at least one of the light emitting elements.

3. The aerodrome system of claim 2, wherein each of the tiles comprises a plurality of light emitting elements and the light emitting elements of a particular tile are configured to display different colors.

4. The aerodrome system of claim 2, wherein each of the tiles is configured to simultaneously display multiple colors or a single color.

5. The aerodrome system of claim 2, wherein each tile is operatively coupled to a plurality of neighboring tiles so as to form a mesh network of tiles.

6. The aerodrome system of claim 2, wherein a top surface of each of the tiles is flat.

7. The aerodrome system of claim 1, wherein the runways are provided either side of a terminal for receiving aircraft.

8. The aerodrome system of claim 1, wherein the runways are parallel with respect to each other and are spaced from each other.

9. The aerodrome system of claim 1, wherein the aerodrome is an aerodrome for short take-off and landing aircraft and/or vertical take-off and landing aircraft.

10. The aerodrome system of claim 1, wherein the controller is operatively coupled to an air traffic control system and the controller is configured to change the orientation of the runways at an appropriate time determined from flight data from the air traffic control system.

11. The aerodrome system of claim 1, wherein the aerodrome system further comprises a plurality of sensors distributable over the surface of the aerodrome so as to determine the location of aircraft on the aerodrome surface.

12. The aerodrome system of claim 11, wherein the sensors are operatively coupled to the controller and the controller is configured to provide feedback to an aircraft providing positional data of the aircraft from the sensors during a landing event.

13. An aerodrome comprising the aerodrome system of claim 1.

14. The aerodrome of claim 13, wherein the aerodrome is elevated above ground level.

15. The aerodrome of claim 13, wherein the light emitting elements are arranged so as to form a circular perimeter of the surface.

16. The aerodrome of claim 13, wherein the light emitting elements are arranged so as to surround a terminal for receiving aircraft.

17. A method of displaying an aerodrome, the method comprising:
   displaying and demarcating a pair of runways for aircraft to take-off or land using a plurality of light emitting elements configured to emit light from a surface of the aerodrome upon which aircraft may take-off, land and maneuver, the light emitting elements emit light of a first color in a first direction along a runway and light of a different color in an opposite direction, and
   wherein the light emitting elements form pixels of a display, the light emitting elements being spaced and having a density such that the runways have a continuously variable orientation; and controlling the light emitting elements so as to change the image displayed by the display and dynamically change the orientation of the runways and to realign the runways in response to a wind direction.

18. A controller for controlling display of an aerodrome, the controller being configured to:

display and demarcate a pair of runways for aircraft to take-off or land using a plurality of light emitting elements configured to emit light from a surface of the aerodrome upon which aircraft may take-off, land and maneuver, the light emitting elements emit light of a first color in a first direction along a runway and light of a different color in an opposite direction, and wherein the light emitting elements form pixels of a display, the light emitting elements being spaced and having a density such that the runways are displayed with a continuously variable orientation; and control the light emitting elements so as to change the image displayed by the display and dynamically change the orientation of the runways and realign the runways in response to a wind direction.

19. An aerodrome system for an aerodrome, the aerodrome system comprising:

a plurality of light emitting elements configured to emit light from a surface of the aerodrome upon which aircraft may take-off, land and maneuver; and a controller operatively coupled to each of the light emitting elements so as to selectively control the light emitting elements to emit light of a first color in a first direction along a runway and light of a different color in an opposite direction, wherein the light emitting elements form pixels of a display, wherein the controller is configured to control an image displayed by the display so as to display and demarcate a pair of runways for aircraft to take-off or land, wherein the light emitting elements are spaced such that the controller may display the runways with a variable orientation, wherein the controller is further configured to change the image displayed by the display so as to dynamically change the orientation of the runways and to realign the runways in response to a wind direction, the runways being differently oriented by the light emitting elements illuminating, turning off or changing color, with each of the runways having distinct light emitting elements controlled by the controller.

* * * * *